(12) United States Patent
Ohtsubo et al.

(10) Patent No.: US 9,311,964 B2
(45) Date of Patent: Apr. 12, 2016

(54) TERMINAL DEVICE, METHOD FOR CONTROLLING TERMINAL DEVICE, AND NON-TRANSITORY RECORDING MEDIUM ON WHICH COMPUTER PROGRAM IS RECORDED

(71) Applicant: Panasonic Intellectual Property Corporation of America, Torrance, CA (US)

(72) Inventors: Shohji Ohtsubo, Osaka (JP); Koji Nakanishi, Osaka (JP); Kotaro Sakata, Tokyo (JP); Hiromi Iida, Osaka (JP); Takuya Matsumoto, Osaka (JP); Norihiro Matsui, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/563,184

(22) Filed: Dec. 8, 2014

(65) Prior Publication Data

US 2015/0170711 A1    Jun. 18, 2015

(30) Foreign Application Priority Data

Dec. 13, 2013    (JP) ................. 2013-257960

(51) Int. Cl.
*H04N 5/84* (2006.01)
*H04N 5/89* (2006.01)
*G11B 27/28* (2006.01)
*G11B 27/34* (2006.01)
*H04N 9/82* (2006.01)
*H04N 5/91* (2006.01)

(52) U.S. Cl.
CPC ............... *G11B 27/28* (2013.01); *G11B 27/34* (2013.01); *H04N 9/8205* (2013.01); *H04N 5/91* (2013.01)

(58) Field of Classification Search
USPC .......................... 386/239–241, 248, 332–336
See application file for complete search history.

(56) References Cited

U.S. PATENT DOCUMENTS

| | | | |
|---|---|---|---|
| 2010/0049517 A1* | 2/2010 | Huang ............... | G06F 17/279 704/251 |
| 2012/0216121 A1* | 8/2012 | Lin ............... | H04N 21/234327 715/721 |

FOREIGN PATENT DOCUMENTS

JP    2002-290955    10/2002

* cited by examiner

*Primary Examiner* — Nigar Chowdhury
(74) *Attorney, Agent, or Firm* — Wenderoth, Lind & Ponack, L.L.P.

(57) ABSTRACT

In a case where a chapter that introduces a predetermined non-heating step is being played back and execution of the non-heating step has not been completed, a moving image playback control section included in a terminal apparatus controls playback so that the chapter that is being played back is repeated or paused, and when execution of the non-heating step is completed, a subsequent chapter is played back.

11 Claims, 9 Drawing Sheets

FIG. 4

| MOVING IMAGE ID | TIME | CHAPTER CONTENTS | STEP TYPE | RELEVANT INFORMATION |
|---|---|---|---|---|
| A001 | 00:00:00 | STEP 1 (CUT BEEF) | NON-HEATING STEP | · DETAILS OF INGREDIENTS<br>· DETAILS OF CUTTING METHOD |
| | 00:00:25 | STEP 2 (CUT CARROT) | NON-HEATING STEP | · DETAILS OF INGREDIENTS<br>· DETAILS OF CUTTING METHOD |
| | ... | ... | ... | ... |
| | 00:16:51 | STEP 8 (ADD SEASONING) | HEATING STEP | · DETAILS OF INGREDIENTS |
| | 00:18:04 | STEP 9 (BOIL AGAIN) | HEATING STEP | · DETAILS OF HEATING CONDITION |

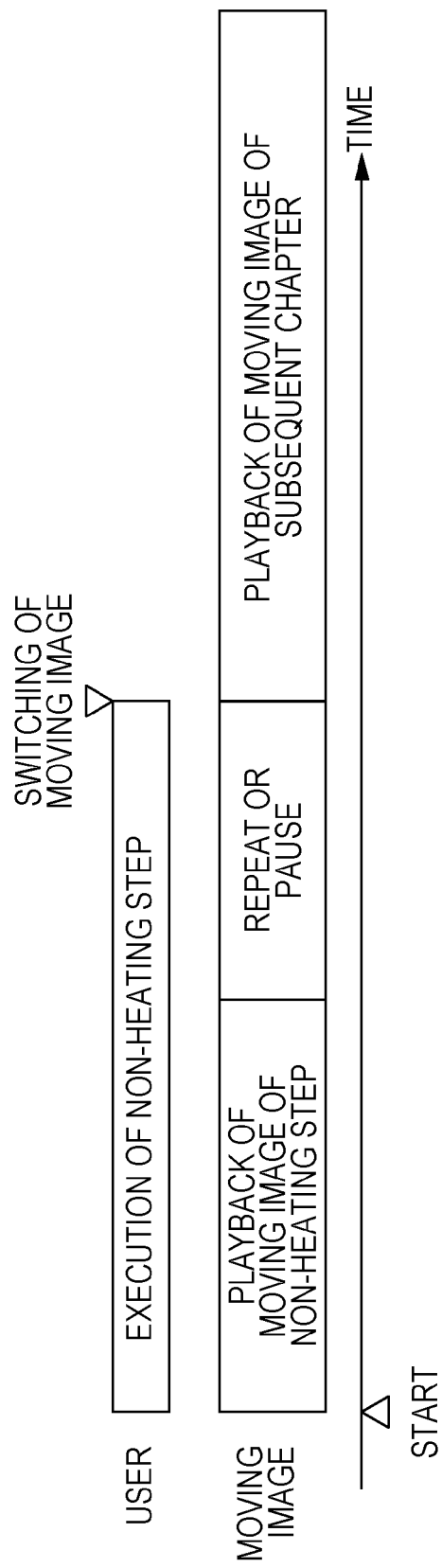

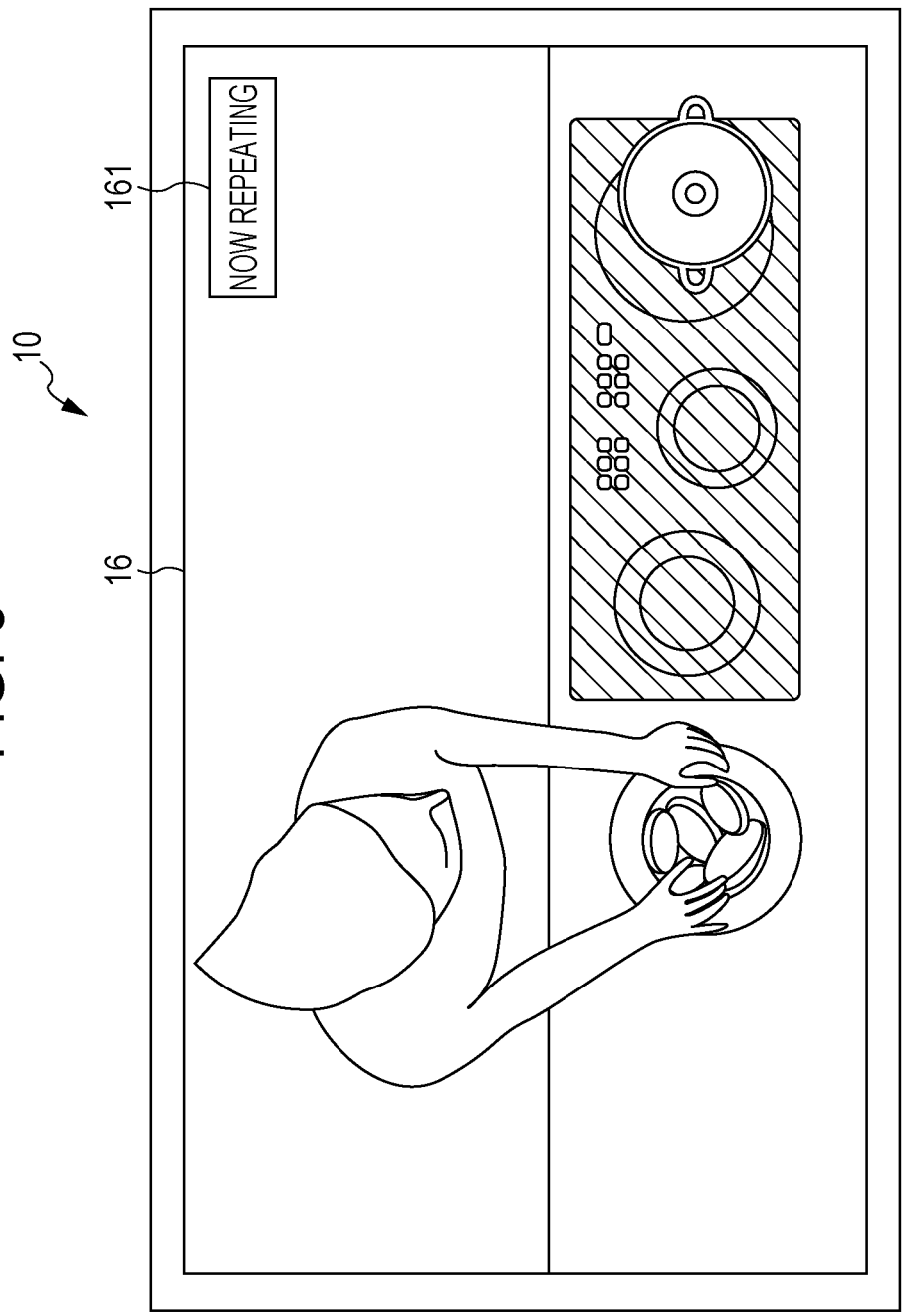

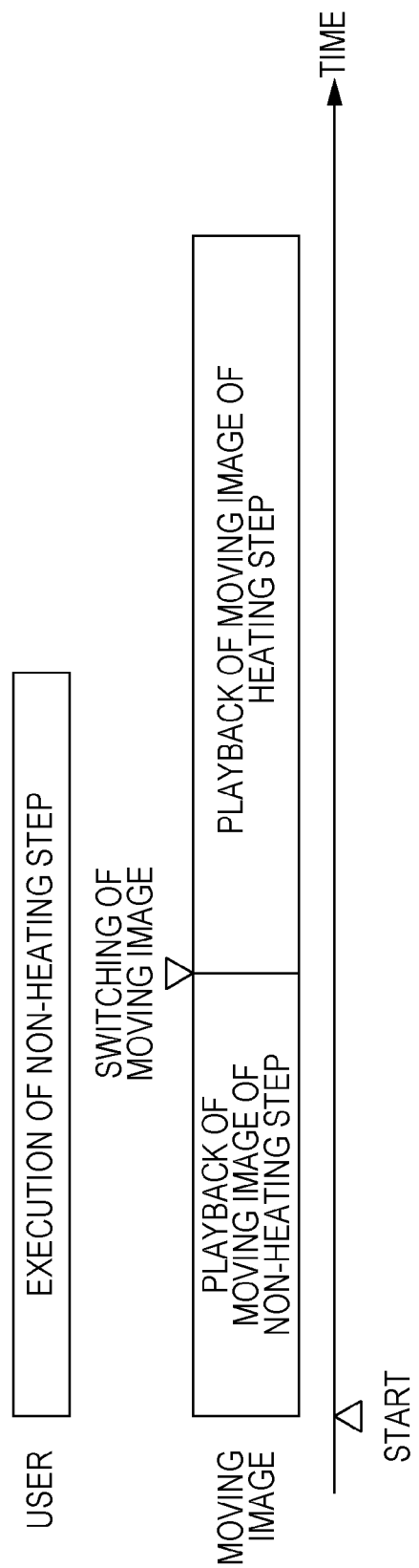

the playback of the moving image in order to complete the non-heating step before the moving image changes to a heating step.

TERMINAL DEVICE, METHOD FOR CONTROLLING TERMINAL DEVICE, AND NON-TRANSITORY RECORDING MEDIUM ON WHICH COMPUTER PROGRAM IS RECORDED

CROSS REFERENCES TO RELATED APPLICATIONS

This Application claims priority to Japanese Patent Application No. 2013-257960, filed on Dec. 13, 2013, the contents of which are hereby incorporated by reference.

BACKGROUND

1. Technical Field

The present disclosure relates to a terminal device that controls playback of a moving image on the basis of content of the moving image, a control method, and a recording medium on which a computer program is recorded.

2. Description of the Related Art

Conventionally, a system for supporting preparation performed by a user using a terminal device by providing recipe information from a server to the terminal device has been proposed.

For example, Japanese Unexamined Patent Application Publication No. 2002-290955 proposes a preparation information system in which a moving image showing preparation states in respective preparation steps is provided from a server to a terminal device in a case where the terminal device requests recipe information for a predetermined menu item from the server. This makes it possible for a user using the terminal device to check specific preparation states in respective preparation steps, thereby allowing the user to smoothly proceed with the preparation.

SUMMARY

A terminal device according to an embodiment of the present disclosure includes: an acquiring section that acquires a moving image that sequentially introduces a plurality of preparation steps and metadata concerning chapters of the moving image that correspond to the plurality of preparation steps; an associating storage section that associates the moving image with the metadata acquired by the acquiring section and that stores therein the moving image and the metadata; and a moving image playback control section that reads out the moving image and the metadata from the associating storage section, that receives recognition result information indicating a result of recognition as to whether or not a preparation step executed by a user in keeping with progress of the moving image is a non-heating step and whether or not the preparation step executed by the user has been completed, and that controls playback of the moving image on the basis of the metadata and the recognition result information, wherein at least one of the acquiring section, the associating storage section, the moving image playback control section, includes a processor, wherein in a case where a chapter that introduces a predetermined non-heating step is being played back and execution of the non-heating step has not been completed, the moving image playback control section repeats or pauses the chapter that is being played back, and wherein in a case where a chapter that introduces a predetermined non-heating step is being played back and execution of the non-heating step is completed, the moving image playback control section playing back a subsequent chapter.

Note that these comprehensive or specific aspects may be realized by a system, a method, and a computer program or may be realized by any combination of a system, a device, a method, and a computer program.

According to the present disclosure, a user can proceed with preparation in keeping with the progress of a moving image without interruption of preparation by manipulation of a moving image.

BRIEF DESCRIPTION OF THE DRAWINGS

FIG. 4 is a view illustrating an example of a configuration of metadata according to the embodiment of the present disclosure.

FIG. 5 is a view for explaining effects of the embodiment of the present disclosure.

FIG. 6 is a view illustrating a display example of a moving image according to Modification 4 of the present disclosure.

FIG. 9 is a view illustrating a relationship between the progress of user's preparation and the progress of playback of a moving image in a conventional moving image control system.

DETAILED DESCRIPTION

Figure 1:
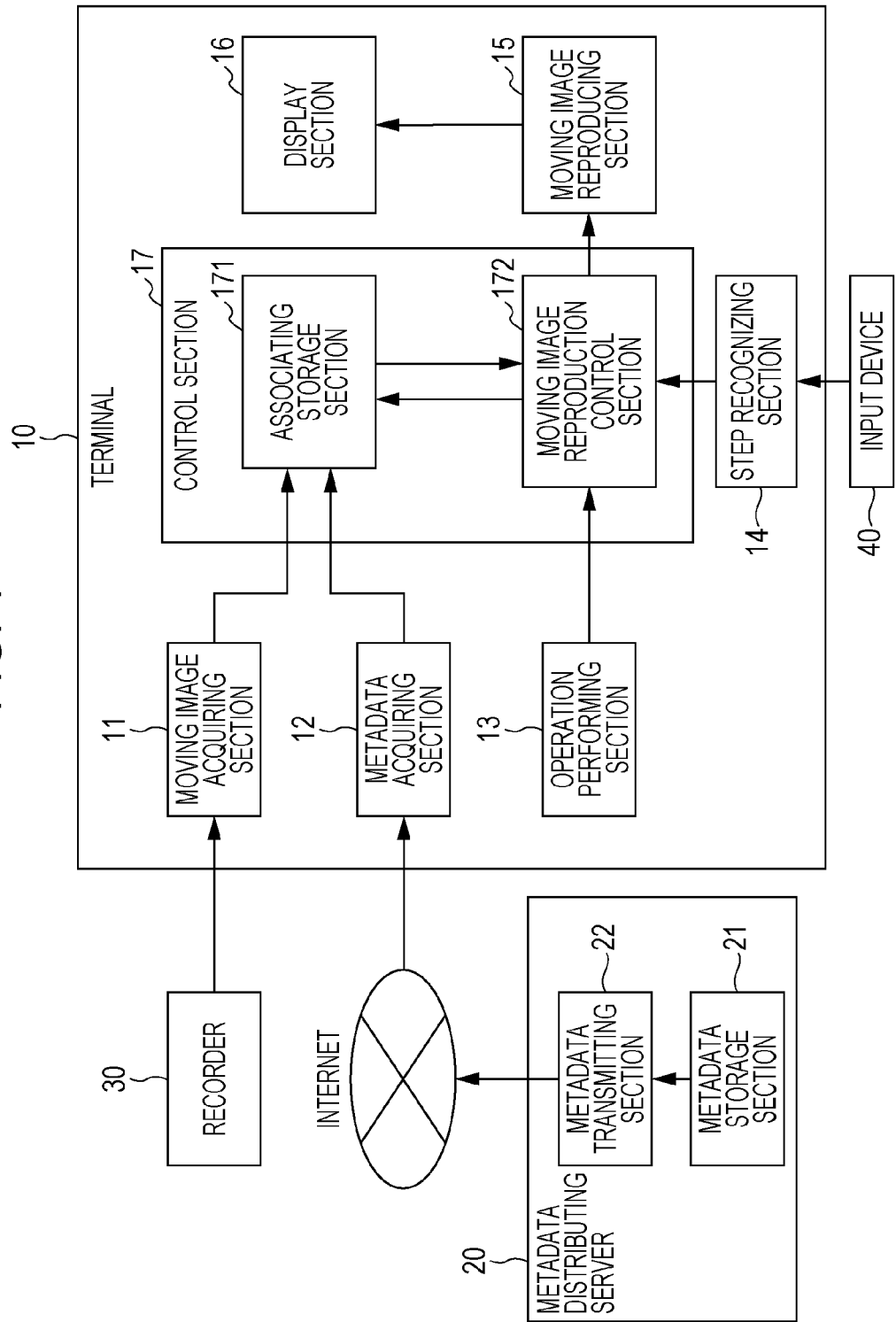
FIG. 1 is a block diagram illustrating an example of a configuration of a moving image control system according to an embodiment of the present disclosure.

First, the following describes matters which the inventors of the present invention studied to accomplish the aspects of the present disclosure.

Findings on Which the Present Invention is Based

Although the preparation information system described in Japanese Unexamined Patent Application Publication No. 2002-290955 is proposed, many people still record a TV preparation program using a recorder and prepare while watching a moving image of preparation steps introduced in the program as has been conventionally done. However, the following problem arises in a case where a person prepares while watching a preparation program.

FIG. 9 is a view for explaining the conventional problem and illustrates an example of a relationship between the progress of user's preparation and the progress of playback of a moving image (preparation program). In general, a preparation program often omits a non-heating preparation step (e.g. an ingredient cutting step; hereinafter referred to as a non-heating step). Accordingly, in a case where a user starts preparation at the same time as the start of playback of a moving image, the moving image changes to a heating preparation step (e.g. an ingredient boiling step; hereinafter referred to as a heating step) during a time in which the user is executing a predetermined non-heating step, as shown in FIG. 9. In a case where a moving image progresses faster than the progress of a user as described above, the user has to pause the moving image, and after the end of the step in execution, the user has to resume playback of the moving image. That is, there is a problem that a user cannot smoothly proceed with preparation because the preparation is interrupted by the need to control progress of a moving image.

The present disclosure is made to provide a terminal device, a control method, and a recording medium on which a computer program is recorded, each of which allows a user to proceed with preparation in keeping with the progress of a moving image without interruption of preparation by controlling progress of the moving image.

A terminal device according to the present disclosure includes: an acquiring section that acquires a moving image, which sequentially introduces a plurality of preparation steps, and metadata concerning chapters of the moving image that correspond to the plurality of preparation steps; an associating storage section that associates the moving image with the metadata and that stores therein the moving image and the metadata, received by the acquiring section, that are associated with each other; and a moving image playback control section that reads out the moving image and the metadata from the associating storage section, that receives recognition result information indicating a result of recognition as to whether or not a preparation step executed by a user in keeping with progress of the moving image is a non-heating step and whether or not the preparation step executed by the user has been completed, and that controls playback of the moving image on the basis of the metadata and the recognition result information, wherein at least one of the acquiring section, the associating storage section, the moving image playback control section, includes a processor, wherein in a case where a chapter that introduces a predetermined non-heating step is being played back and execution of the non-heating step has not been completed, the moving image playback control section being used to repeat or pause the chapter that is being played back, and wherein in a case where a chapter that introduces a predetermined non-heating step is being played back and execution of the non-heating step is completed, the moving image playback control section plays back a subsequent chapter.

According to the arrangement, the user can proceed preparation in keeping with the moving image without interruption of preparation by controlling progress of the moving image.

The terminal device according to the present disclosure may further include a step recognizing section that recognizes whether or not the preparation step executed by the user in keeping with the progress of the moving image is a non-heating step and that recognizes whether or not the preparation step executed by the user has been completed, the recognition result information is supplied to the moving image playback control section by the step recognizing section.

According to the arrangement, the terminal device can recognize whether or not the preparation step executed by the user is a non-heating step and whether or not the preparation step executed by the user has been completed.

The terminal device may further include a recognition result acquiring section that acquires the recognition result information from an external device connected to the terminal device. The recognition result acquiring section supplies the acquired recognition result information to the moving image playback control section.

According to the arrangement, it is possible to acquire the recognition result information from outside of the terminal device.

The terminal device according to the present disclosure may be arranged such that information concerning the preparation steps is registered as part of the metadata so as to be associated with the respective chapters; and the moving image playback control section displays, in the form of a telop (superimposed content) or a still image, information concerning a preparation step introduced in a subsequent chapter on the basis of the information concerning the preparation steps while repeating or pausing a predetermined chapter.

According to the arrangement, the user can recognize the next step in advance.

The terminal device according to the present disclosure may be arranged such that, during repeat of a predetermined chapter, the moving image playback control section generates a display indicating that the predetermined chapter is being repeated.

According to the arrangement, the user can recognize that the chapter that is being played back is being repeated.

The terminal device according to the present disclosure may be arranged such that information indicative of a point in time at which a list display image showing a list of ingredients and amounts of the ingredients is displayed is registered as part of the metadata so as to be associated with any of the chapters; and in a case where display of the list display image is requested, the moving image playback control section displays the list display image by jumping to the point in time on the basis of the information indicative of the point in time.

According to the arrangement, the user can easily check a list of ingredients without fast-forwarding or rewinding to search for the list display image.

The terminal device according to the present disclosure may be arranged such that information indicating that ingredients are heated to a predetermined state is registered as part of the metadata so as to be associated with a chapter that introduces a predetermined heating step; and when the chapter that introduces the predetermined heating step is played back, the moving image playback control section repeats, pauses, or slow-plays the chapter that introduces the predetermined heating step on the basis of the information indicating that the ingredients are heated to the predetermined state until the moving image playback control section receives recognition result information indicating that the ingredients have reached the predetermined state.

According to the arrangement, even in a case where there is a difference in heat level, preparation appliance, the amounts or sizes of ingredients, etc. between the heating step introduced in the chapter and the heating step executed by the user, it is possible for the user to terminate the heating step at the same timing as the end of playback of the chapter that introduces the heating step.

The terminal device according to the present disclosure may be arranged such that in a case where a predetermined signal sent from a device that is capable of communicating with the terminal device via a network is detected during playback of a chapter that introduces a predetermined heating step or in a case where recognition result information indicating that preparation has been interrupted is received during playback of the chapter that introduces the predetermined heating step, the moving image playback control section pauses playback of the chapter that introduces the predetermined heating step.

According to the arrangement, when the user interrupts preparation, playback of the chapter that introduces the predetermined heating step can be paused without a special operation input.

The terminal device according to the present disclosure may be arranged such that the moving image playback control section controls that playback of the chapter, introducing the predetermined heating step, is repeated, paused, or slow-played during a period of time from a time of resuming the preparation to a time at which the temperature of the ingredients returns to a temperature at a time of interrupting the preparation.

According to the arrangement, in a case where the user resumes playback of the moving image and preparation after interruption, the user can resume preparation without being concerned about a decline in the temperature of the ingredients during the interruption of heating.

A method of the present disclosure for controlling a terminal device, the method causing a computer of the terminal device to: acquire a moving image that sequentially introduces a plurality of preparation steps and metadata concerning chapters of the moving image that correspond to the plurality of preparation steps; associate the moving image with the metadata; store, in a predetermined storage section, the moving image and the metadata that are associated with each other; read out the moving image and the metadata from the storage section; receive recognition result information indicative of a result of recognition as to whether or not a preparation step executed by a user in keeping with progress of the moving image is a non-heating step and whether or not the preparation step executed by the user has been completed; and control playback of the moving image on the basis of the metadata and the recognition result information, wherein at least one of the acquisition of the moving image, the association of the moving image, the storage of the moving image and the metadata, the reading out the moving image and the metadata, the reception of recognition result information, and the control of the playback is performed by a processor, wherein in a case where a chapter that corresponds to a predetermined non-heating step is being played back and execution of the predetermined non-heating step has not been completed, the chapter that is being played back is repeated or paused, and wherein in a case where a chapter that corresponds to a predetermined non-heating step is being played back and execution of the non-heating step is completed, a subsequent chapter is played back.

According to the arrangement, the user can proceed with preparation in keeping with the moving image without an interruption of preparation by controlling progress of the moving image.

A medium of the present disclosure is a non-transitory tangible recording medium on which a computer-readable computer program is recorded. The program causing the computer to: acquire a moving image that sequentially introduces a plurality of preparation steps and metadata concerning chapters of the moving image that correspond to the plurality of preparation steps; associate the moving image with the metadata; store, in a predetermined storage section, the moving image and the metadata that are associated with each other; read out the moving image and the metadata from the storage section; receive recognition result information indicative of a result of recognition as to whether or not a preparation step executed by a user in keeping with progress of the moving image is a non-heating step and whether or not the preparation step executed by the user has been completed; and control playback of the moving image on the basis of the metadata and the recognition result information, wherein in a case where a chapter that corresponds to a predetermined non-heating step is being played back and execution of the predetermined non-heating step has not been completed, the chapter that is being played back is repeated or paused, and wherein in a case where a chapter that corresponds to a predetermined non-heating step is being played back and execution of the non-heating step is completed, a subsequent chapter is played back.

According to the arrangement, the user can proceed with preparation in keeping with the moving image without interruption of preparation by controlling progress of the moving image.

(Embodiment)

Embodiments of the present disclosure are described below in detail with reference to the drawings.

Note that the embodiments described below are specific examples of the present disclosure. Numerical values, shapes, constituent elements, steps, and the order of steps shown in the embodiments below are examples and not intended to limit the present disclosure. Furthermore, out of the constituent elements in the embodiments below, constituent elements that are not described in independent claims in which the highest concepts are shown are described as optional constituent elements. Furthermore, in all of the embodiments, contents of the embodiments may be combined.

FIG. 1 is a block diagram illustrating an example of a configuration of a moving image control system according to an embodiment of the present disclosure. As shown in FIG. 1, this moving image control system includes a terminal 10 (an example of the terminal device of the present disclosure), a metadata distributing server 20, a recorder 30, and an input device 40.

In FIG. 1, the terminal 10 and the metadata distributing server 20 are connected to each other, for example, via the Internet. Note that a network connecting the terminal 10 and the metadata distributing server 20 may be one other than the Internet. Furthermore, the network may be a wireless network, a wired network, or a network combining a wired network and a wireless network. Similarly, the terminal 10 and the recorder 30 and the terminal 10 and the input device 40 are connected to each other via a wired network, a wireless network, or a network combining a wired network and a wireless network.

The terminal 10 is, for example, an information processing device such as a smartphone or a tablet. The terminal 10 includes a moving image acquiring section 11, a metadata acquiring section 12, an operation performing section 13, a step recognizing section 14, a moving image playback section 15, a display section 16, and a control section 17.

The moving image acquiring section 11 is a communication interface that receives a moving image transmitted from the recorder 30. The moving image acquiring section 11 supplies the received moving image to an associating storage section 171 of the control section 17.

The moving image is, for example, a TV preparation program (a program that sequentially introduces a plurality of preparation steps in the form of a moving image) recorded in the recorder 30. A specific example of the moving image is described later with reference to FIG. 3.

The recorder 30 is a device that is capable of recording a moving image such as a TV program. The recorder 30 is, for example, a hard disc recorder, a Blu-ray disc recorder, or the like.

The metadata acquiring section 12 is a communication interface that receives metadata transmitted from the metadata distributing server 20. The metadata acquiring section 12 supplies the received metadata to the associating storage section 171 of the control section 17.

The metadata includes information concerning chapters that are present in each moving image and constitute the moving image. A specific example of the metadata is described later with reference to FIG. 4.

The metadata distributing server 20 has a metadata storage section 21 in which the metadata is stored and a metadata transmitting section 22 that transmits the metadata stored in the metadata storage section 21 to the terminal 10. The metadata storage section 21 is a storage device such as a nonvolatile memory or a hard disc, and the metadata transmitting section 22 is a communication interface that enables Internet communication.

The operation performing section 13 is an input device, such as a button or a touch panel, that accepts a user's input. Upon receipt of a user's input, the operation performing section 13 supplies information indicative of the contents of the operation to a moving image playback control section 172 of the control section 17.

Examples of user's input include an operation for selecting a desired moving image, an operation of instructing playback of the selected moving image (hereinafter referred to as a playback instructing operation), and an operation of instructing a stop or pause of playback of a moving image that is being played back (hereinafter referred to as a playback stop operation and a playback pause operation).

The step recognizing section 14 is a control device, such as a processor, that receives step-in-execution information from the input device 40 and recognizes a preparation step which the user is executing (hereinafter referred to as a step in execution) on the basis of the information. Specifically, the step recognizing section 14 recognizes whether the step in execution is a heating step or a non-heating step and whether or not the step in execution has been completed. For example, the step recognizing section 14 recognizes the step in execution by performing image recognition of an image obtained by capturing an area around the hands of a user who is performing preparation. Alternatively, for example, the step recognizing section 14 recognizes the step in execution by performing voice recognition of the voice of a user who is performing preparation (e.g. a voice indicating what kind of preparation step the user is trying to start or voice indicating what kind of preparation step the user has completed). Alternatively, for example, the step recognizing section 14 recognizes the step in execution by switching on and switching off a preparation appliance that is being used for preparation. Then, the step recognizing section 14 supplies recognition result information indicative of the recognition result to the moving image playback control section 172 of the terminal 10.

The heating step is a preparation step that involves heating such as boiling, stir-frying, roasting, steaming, or deep-frying. Meanwhile, the non-heating step is a preparation step that does not involve heating such as washing, peeling, cutting, or grinding.

The step-in-execution information is information concerning the step in execution such as an image obtained by capturing an area around the hands of a user who is performing preparation, the voice of a user who is performing preparation, or information indicative of an operation state of a preparation appliance that is being used for preparation.

The input device 40 is, for example, a camera for capturing an area around the hands of a user who is performing preparation, a microphone for picking up the voice of a user who is performing preparation, or a preparation appliance that is being used for preparation (e.g. a microwave, an electromagnetic cooker).

The moving image playback section 15 is a control device, such as a processor, that plays back the moving image supplied from the control section 17 and causes the moving image to be displayed on the display section 16.

The display section 16 is a display device, such as a display, that displays the played back moving image.

The control section 17 is a control device, such as a processor, that controls playback of the moving image in the moving image playback section 15. The control section 17 has the associating storage section 171 and the moving image playback control section 172.

For example, the associating storage section 171 is a memory device which includes one or more memories, a writable recording medium or the like. The associating storage section 171 receives the moving image acquired by the moving image acquiring section 11 and the metadata acquired by the metadata acquiring section 12 and associates the moving image with the metadata and stores therein the moving image and the metadata that. This association is performed, for example, on the basis of identification information (e.g. moving image ID that is described later) given to the moving image and the metadata. Note that specific examples of the moving image and the metadata are described later with reference to FIG. 3 and FIG. 4, respectively.

Upon receipt of information indicative of a playback instructing operation for instructing playback of a predetermined moving image from the operation performing section 13, the moving image playback control section 172 reads out the moving image and metadata from the associating storage section 171. Then, the moving image playback control section 172 supplies the moving image thus read out to the moving image playback section 15 and instructs the moving image playback section 15 to play back the moving image.

After the playback instruction, the moving image playback control section 172 determines on the basis of the metadata whether or not a playback time of the moving image that is being played back has reached a time of a boundary between chapters.

In a case where it is determined that the playback time has reached the time of the boundary between chapters, the moving image playback control section 172 controls playback of the moving image on the basis of recognition result information received from the step recognizing section 14.

For example, in a case where the recognition result information indicates that a step in execution is a heating step, the moving image playback control section 172 instructs the moving image playback section 15 to play back a subsequent chapter.

Meanwhile, for example, in a case where the recognition result information indicates that the step in execution is a non-heating step and that the step has been completed, the moving image playback control section 172 instructs the moving image playback section 15 to play back a subsequent chapter.

Meanwhile, for example, in a case where the recognition result information indicates that the step in execution is a non-heating step and that the step has not been completed, the moving image playback control section 172 instructs the moving image playback section 15 to repeat or pause a chapter that is being played back without proceeding to a subsequent chapter.

Figure 2:
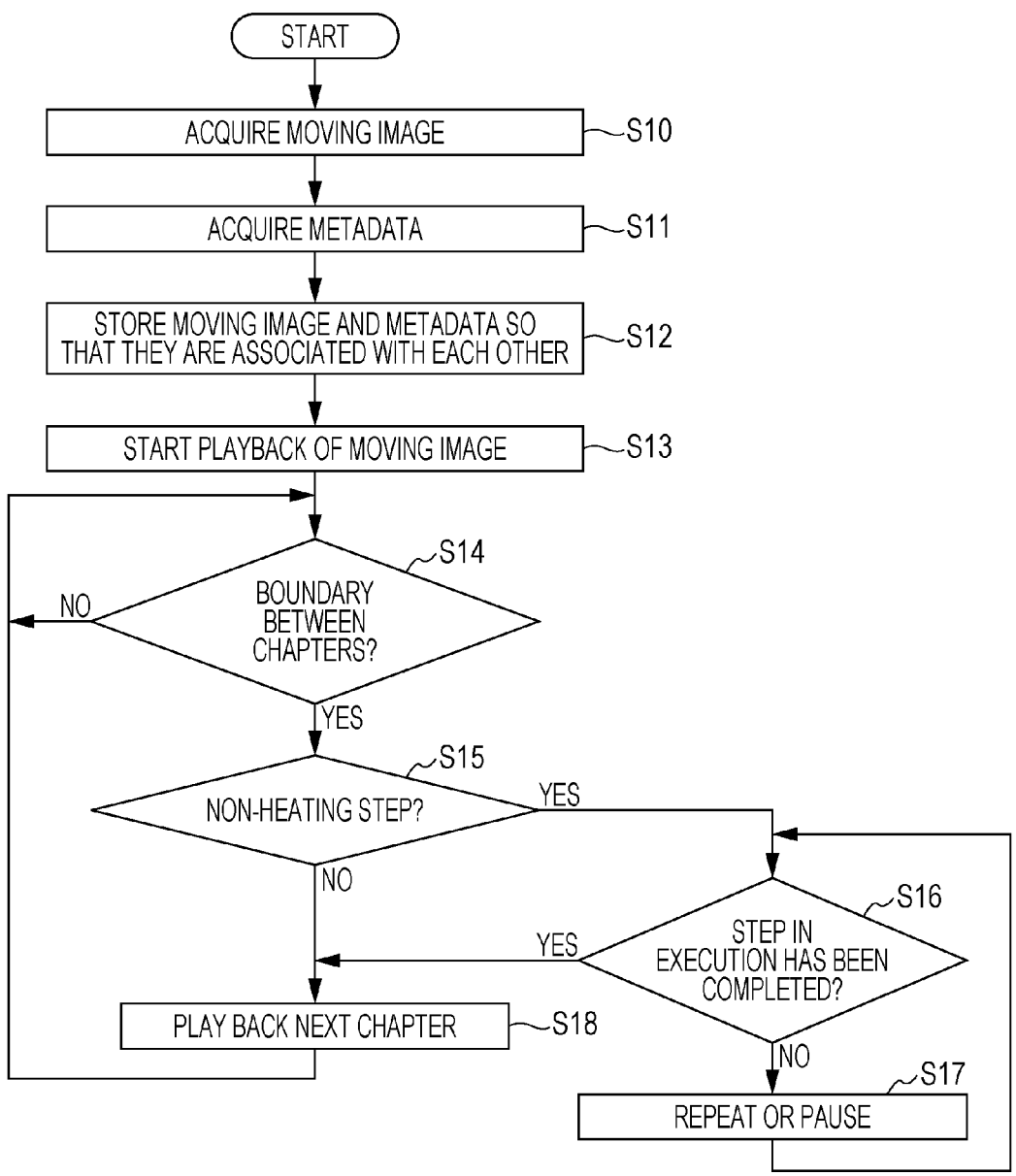
FIG. 2 is a flow chart showing an example of a moving image playback control operation according to the embodiment of the present disclosure.

Next, an example of a processing procedure of moving image playback control processing of the terminal 10 according to the present embodiment is described. FIG. 2 is a flow chart showing an example of the processing procedure of the moving image playback control processing of the terminal 10.

In Step S10, the moving image acquiring section 11 acquires, from the recorder 30, a moving image recorded in the recorder 30.

Figure 3:
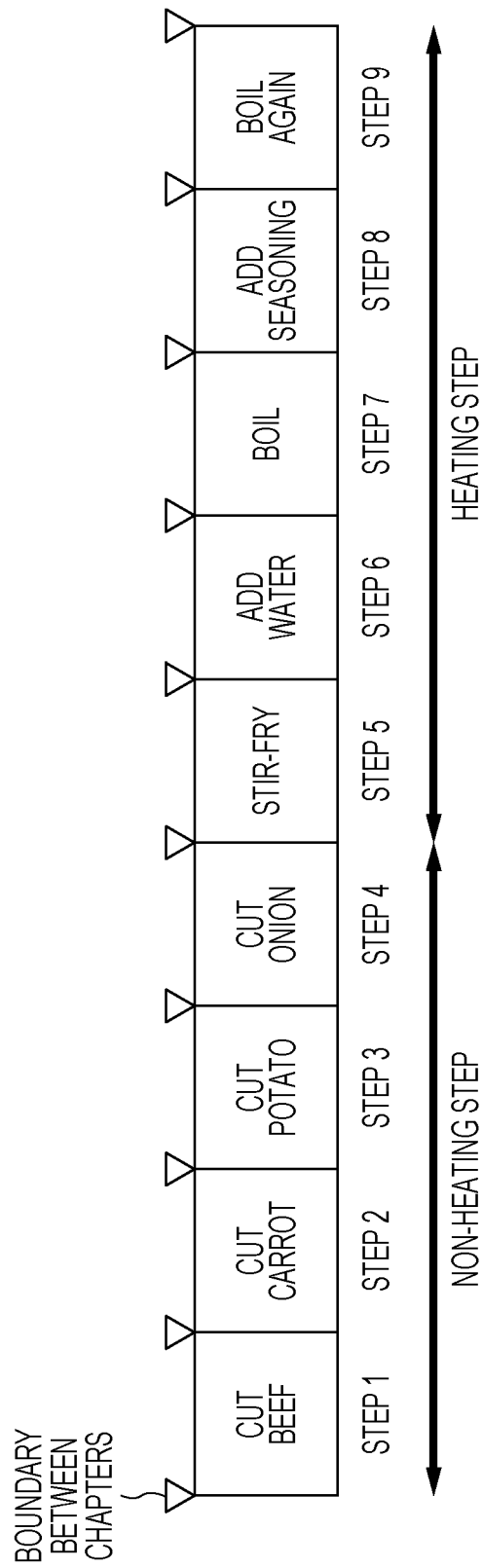
FIG. 3 is a view illustrating an example of a configuration of a moving image according to the embodiment of the present disclosure.

An example of the moving image acquired by the moving image acquiring section 11 is described below. FIG. 3 is a view illustrating a configuration example of the moving image.

As illustrated in FIG. 3, the moving image is configured such that nine preparation steps for a predetermined menu item, i.e., Step 1 through Step 9 are sequentially introduced. Out of the nine preparation steps, Steps 1 through 4 are non-heating steps and Steps 5 through 9 are heating steps. The moving image is divided into units of a predetermined time on the basis of metadata that is described later. Such units of the moving image are referred to as "chapters". In FIG. 3, boundaries between the chapters are shown. The boundaries between the chapters are, in other words, start times of the chapters. In the present embodiment, an example in which the chapters correspond to the respective steps one to one is described. That is, a moving image that corresponds to Step 1 is referred to as "Chapter 1". Similarly, moving images that correspond to Steps 2 through 9 are referred to as "Chapter 2" through "Chapter 9", respectively.

An example of the moving image acquired by the moving image acquiring section 11 has been described above. The following returns to explanation of FIG. 2.

In Step S11, the metadata acquiring section 12 acquires the metadata stored in the metadata distributing server 20 from the metadata distributing server 20.

An example of the metadata acquired by the metadata acquiring section 12 is described below. FIG. 4 is a configuration example of the metadata.

As illustrated in FIG. 4, the metadata includes moving image ID, time, chapter contents, step type, and relevant information.

The moving image ID is information that can identify the moving image transmitted from the recorder 30 to the terminal 10.

The time is information indicative of a start time (e.g. hour, minute, second) of a chapter.

The chapter contents are information indicative of contents of a chapter. In the present embodiment, the moving image is divided in advance into chapters corresponding to Steps 1 through 9 as described above. Therefore, the chapter contents may include contents of a step (e.g. "cutting beef").

The step type is information indicative of the type of a step (e.g. heating step/non-heating step).

The relevant information is information relevant to a step. The relevant information is, for example, details of ingredients used in the step (e.g. kinds and amounts of the ingredients), details of a cutting method of the ingredients used in the step (e.g. knack for cutting), and details of a heating condition in the step (e.g. temperature of heating, change of the ingredients by heating).

An example of the metadata acquired by the metadata acquiring section 12 has been described above. The following returns to explanation of FIG. 2.

In Step S12, the associating storage section 171 of the control section 17 stores therein the moving image acquired by the moving image acquiring section 11 and the metadata acquired by the metadata acquiring section 12 so that the moving image and the metadata are associated with each other. For example, the associating storage section 171 matches the moving image ID assigned to the moving image and the moving image ID assigned to the metadata, and in a case where the moving image ID and the moving image ID match each other, the associating storage section 171 associates the moving image and the metadata with each other.

In Step S13, the moving image playback control section 172 of the control section 17 reads out the moving image and the metadata from the associating storage section 171 on the basis of the playback instructing operation accepted by the operation performing section 13, and then instructs the moving image playback section 15 to play back the moving image thus read out. This starts displaying the moving image, played back by the moving image playback section 15, on the display section 16. For example, playback of a moving image of Step 1 (Chapter 1) starts. At the same time as the start of playback of the moving image, a user starts preparation, and proceed with the preparation in keeping with the progress of the moving image. Accordingly, a step introduced in the chapter that is being played back corresponds to a step in execution.

The moving image playback control section 172 may, automatically or in response to a request from the user, instruct the moving image playback section 15 to display the relevant information (see FIG. 4) of the metadata on the display section 16 during playback of the chapter. The contents of the relevant information are, for example, displayed in the form of a still image or a telop at a position that does not hinder viewing of the user.

In Step S14, the moving image playback control section 172 determines on the basis of the metadata whether or not a playback time of the chapter has reached a time of a boundary between chapters. For example, in a case where Chapter 1 is being played back, the moving image playback control section 172 determines whether or not the playback time of Chapter 1 has reached a time of the boundary between Chapter 1 and Chapter 2 (i.e. the start time of Chapter 2). This determination in Step S14 is repeated until the playback time of the chapter reaches the time of the boundary (Step S14: NO). In a case where it is determined that the playback time of the chapter has reached the time of the boundary (Step S14: YES), the flow proceeds to Step S15.

In Step S15, the moving image playback control section 172 determines on the basis of the recognition result information received from the step recognizing section 14 whether or not the step in execution is a non-heating step.

In a case where it is determined in Step S15 that the step in execution is not a non-heating step (Step S15: NO), the flow proceeds to Step S18. Meanwhile, in a case where the step in execution is a non-heating step (Step S15: YES), the flow proceeds to Step S16.

In Step S16, the moving image playback control section 172 determines on the basis of the recognition result information received from the step recognizing section 14 whether or not the step in execution has been completed.

In a case where it is determined in Step S16 that the step in execution has been completed (Step S16: YES), the flow proceeds to Step S18. Meanwhile, in a case where the step in execution has not been completed (Step S16: NO), the flow proceeds to Step S17.

In Step S17, the moving image playback control section 172 instructs the moving image playback section 15 to repeat or pause the chapter that is being played back. The display section 16 displays the repeated or paused chapter played back by the moving image playback section 15. For example, instead of proceeding to Chapter 2, Chapter 1 is repeat-played back or playback is paused at the start of Chapter 2. Note that repeat playback means repeatedly playing back only a predetermined chapter.

After the control in Step S17, the flow returns to Step S16. That is, repeat playback or pause is executed until the user completes the step in execution.

In Step S18, the moving image playback control section 172 instructs the moving image playback section 15 to play back a subsequent chapter. This starts displaying moving images corresponding to the subsequent chapter (e.g. Chapter 2), played back by the moving image playback section 15, on the display section 16.

FIG. 5 is a view for explaining effects of the present embodiment and illustrates an example of a relationship between the progress of user's preparation and the progress of playback of a moving image (preparation program). As illustrated in FIG. 5, according to the terminal 10 according to the present embodiment, in a case where a chapter of a non-heating step is being played back and execution of the non-heating step has not been completed, this chapter is repeated or paused, and when execution of the step is completed, playback of a subsequent chapter is started. This makes it possible to proceed with preparation in keeping with the progress of a moving image without interruption of the preparation by manipulation of the moving image.

An embodiment of the present disclosure has been described so far, but the embodiment of the present disclosure is not limited to this. The following describes modifications of the embodiment of the present disclosure.

Modification 1

For example, in the above embodiment, metadata is distributed via a network and associated with a moving image in a terminal 10. However, the present disclosure is not limited to this. For example, metadata may be given to a moving image in a metadata distributing server 20, a recorder 30, or another device that is not illustrated. According the present modification, it is possible to eliminate processing of associating a moving image and metadata with each other in the terminal 10.

Modification 2

For example, in the above embodiment, the step type is included in metadata in advance as a flag for determining whether or not moving image control (repeat or pause) is executed. However, the present disclosure is not limited to this. For example, the flag may be given on the basis of another item (e.g. chapter contents) of the metadata. For example, after acquiring the metadata of FIG. 3 (excluding the step type), an associating storage section 171 determines the step type for each chapter of the metadata by referring to a table that is separately prepared (e.g. information that defines, for each of the chapter contents, whether a step is a heating step or a non-heating step), and then gives the result to the metadata. According to the present modification, it is therefore possible to reduce the amount of data distributed from a metadata distributing server 20 to a terminal 10. Alternatively, the flag may be given on the basis of determination of a moving image by a moving image acquiring section 11. For example, after acquiring a predetermined moving image, the moving image acquiring section 11 analyzes the moving image. This analysis is performed, for example, by pattern matching between a table that is separately prepared (e.g. information that defines, for each audio pattern and/or video pattern included in the moving image, whether a step is a heating step or a non-heating step) and the moving image thus acquired. In a case where it is determined as a result of the analysis that the moving image thus acquired is a non-heating step, the moving image acquiring section 11 gives the moving image a flag indicating that moving image control is executed. Meanwhile, in a case where the moving image thus acquired is a heating step, the moving image acquiring section 11 gives the moving image a flag indicating that moving image control is not executed. Such an operation produces an effect that management of metadata (i.e. the metadata distributing server 20) becomes unnecessary.

Modification 3

For example, in the above embodiment, during playback of a predetermined chapter, relevant information of the chapter may be displayed. However, the present disclosure is not limited to this. For example, a moving image playback control section 172 may control playback of a moving image so that information concerning a preparation step introduced in a subsequent chapter (e.g. chapter contents or relevant information included in metadata) is displayed in the form of a telop or a still image during playback of a predetermined chapter (including repeat playback or pause). According to the present modification, it is possible for a user to recognize a next step in advance.

Modification 4

For example, in the above embodiment, during repeat playback, display indicating that the repeat playback is being executed may be performed. For example, a moving image playback control section 172 may control playback of a moving image so that a text indicating that repeat playback is being executed is displayed or may control playback of a moving image so that the moving image is displayed at a different color, color saturation and luminance from those of normal playback. FIG. 6 illustrates an example of the former case. As illustrated in FIG. 6, a moving image, which is repeated-played back by the moving image playback section 15, is displayed on a display section 16 of a terminal 10, and a text string 161 "NOW REPEATING" is displayed within the moving image. According to the present modification, it is possible for a user to recognize that a chapter that is being played back is on repeat.

Modification 5

For example, in the above embodiment, a function of jumping to a list display image in response to a request from a user may be achieved. The list display image is an image of a list of ingredients and the amounts of the ingredients used in preparation. In a case where a point in time at which the list display image is displayed is registered as part of relevant information of metadata, a moving image playback control section 172 may control playback of a moving image upon receipt of a request from a user to display the list display image so that the list display image is displayed by jumping to the point in time. According to the present modification, it is possible for a user to easily check a list of ingredients without fast-forwarding or rewinding to search for the list display image. Furthermore, the list display image is displayed for a predetermined time, and after passage of the predetermined time, the moving image playback control section 172 may control playback of the moving image so that a moving image after passage of the predetermined time is displayed. This allows a user to watch a moving image at an appropriate point in time after display of the list display image. In the present modification, an example of jumping to a point in time at which the list display image is displayed has been described. However, image data of the list display image that is registered as part of metadata may be displayed. This makes it possible to display the list display image without jumping.

Modification 6

For example, in the above embodiment, in a case where a chapter of a predetermined heating step is played back, the playback of the chapter may be controlled until the state of ingredients that are being heated (e.g. color of the ingredients) changes. This control is, for example, any of repeat playback, pause, and slow playback. For example, in a case where relevant information indicating "heat the ingredients until the color of the ingredients evenly changes" is registered corresponding to Chapter 5 in which "stir-frying" step is introduced, a moving image playback control section 172 may control playback of Chapter 5 until the moving image playback control section 172 receives recognition result information indicating that the color of the ingredients has evenly changed. The recognition result information is, for example, information obtained through image recognition of a change of the color of the ingredients in a step recognizing section 14. Note that along with the above control, the moving image playback control section 172 may control playback so that relevant information (indicating "heat the ingredients until the color of the ingredients evenly changes") is displayed on a screen. A heating step does not necessarily end at the same time as a moving image because of a difference in heat level, preparation appliances, the amount or size of ingredients, etc. However, according to the present modification, the end of execution of a heating step by a user can be made the same as the end of playback of a moving image (or a chapter) that introduces the heating step irrespective of the above difference. Furthermore, in a case where there is a next preparation step after the heating step, a user can promptly proceed with preparation in keeping with the progress of a moving image (or a chapter) that introduces the next preparation step.

Modification 7

For example, in the above embodiment, in a case where a moving image playback control section 172 has received a signal transmitted from an appliance (or a device) connected with a terminal 10 via a network during playback of a chapter that introduces a predetermined preparation step, the moving image playback control section 172 may pause playback of the chapter. The signal is, for example, a signal from a telephone indicative of an incoming call, a signal from a personal computer indicative of reception of an e-mail, and a signal from an intercom indicative of a call.

With such an arrangement, for example, in a case where a user stops execution of a heating step, it is possible to pause playback of a chapter that introduces the heating step without any special operation input.

Furthermore, with such an arrangement, for example, in a case where a user stops execution of a non-heating step, it is possible to pause playback of a chapter that introduces the non-heating step without any special operation input.

Alternatively, for example, in a case where the moving image playback control section 172 receives recognition result information indicating that execution of a predetermined preparation step by a user has been interrupted during playback of a chapter that introduces the predetermined preparation step, the moving image playback control section 172 may pause playback of the chapter. The recognition result information is, for example, information obtained by image recognition in a step recognizing section 14 indicating that the user's hands have disappeared or information obtained by detecting that a preparation appliance has been turned off.

With such an arrangement, for example, in a case where a user interrupts execution of a heating step, it is possible to pause playback of a chapter that introduces the heating step without any special operation input.

Furthermore, with such an arrangement, for example, in a case where a user interrupts execution of a non-heating step, it is possible to pause playback of a chapter that introduces the non-heating step without any special operation input.

The following describes processing performed in a case where heating is stopped by a user's operation when playback of a chapter is paused. Note that heating may be stopped not by a user's operation but by causing a control section 17 to control a preparation appliance to stop heating.

In this case, temperature of ingredients declines from the time of pause of the chapter (i.e. the time of stop of the heating) to the resuming of preparation. That is, the moving image playback control section 172 may control playback of a chapter that has been paused (e.g. any of repeat playback, pause, and slow playback) during a period of time from a time at which the preparation appliance starts heating again (i.e. re-heating) to a time at which a temperature of ingredients returns to a temperature at a time of stop of the heating. A specific procedure of this operation is described below. In the following description, a case where a heating step is a "boiling" step is described as an example.

First, the moving image playback control section 172 acquires, as data acquired by experiments of a "boiling" step, data (hereinafter referred to as "change rate data") indicative of the rate of temperature rise of ingredients to a heating time and the rate of temperature decline of ingredients to an elapsed time.

Next, when playback of Chapter 7 starts, the moving image playback control section 172 measures an elapsed time T1 from the start of playback (in other words, the point in time when a user starts the "boiling" step).

Next, upon detection of interruption of preparation on the basis of an incoming call etc. or recognition result information indicative of interruption of preparation, the moving image playback control section 172 controls playback so that playback of Chapter 7 is paused. At this time, the moving image playback control section 172 stores the elapsed time T1 and measures an elapsed time T2 from the pause of Chapter 7 (in other words, the point in time when a user interrupts the "boiling" step).

Next, the moving image playback control section 172 calculates temperature C1 of ingredients at the time of pause of Chapter 7 on the basis of temperature of the ingredients before heating (for example, registered in advance as part of relevant information of metadata), the change rate data, and the stored elapsed time T1.

Next, upon detection of resuming of preparation on the basis of the recognition result information indicative of resumming of preparation, the moving image playback control section 172 stores the elapsed time T2. The recognition result information is, for example, information obtained by image recognition of user's hands in the step recognizing section 14 or information obtained by detecting that a preparation appliance has been turned on.

Next, the moving image playback control section 172 calculates temperature C2 of the ingredients at the resuming of the "boiling" step (at the start of reheating) on the basis of the stored elapsed time T2, the temperature T1, and the change rate data.

Next, the moving image playback control section 172 calculates a time T3 on the basis of the temperature C1, the temperature C2, and the change rate data. The time T3 is a heating time that is needed to return the temperature C2 to the temperature C1.

Next, the moving image playback control section 172 controls playback so that the pause of Chapter 7 continues during the time T3. Alternatively, the moving image playback control section 172 may control playback so that repeat playback or slow playback of Chapter 7 is performed during the time T3.

According to the present modification, in a case where a user resumes playback of a moving image and preparation after interruption, the user can resume preparation without being concerned about a decline in temperature of ingredients that has occurred during the interruption of heating.

Modification 8

For example, in the above embodiment, a moving image is a TV preparation program recorded in a recorder 30. However, the present disclosure is not limited to this. That is, the type of a moving image may be, for example, a moving image distributed on the Internet (e.g. video on demand) or may be a moving image shot by a user, provided that it is a moving image that sequentially introduces a plurality of preparation steps. Moreover, a device in which the moving image is to be stored is not limited to the recorder 30, and may be, for example, a smartphone or a tablet (the terminal 10 or a terminal other than the terminal 10).

Modification 9

For example, the functions of the terminal 10 according to the above embodiment can be realized by a computer program.

Figure 7:
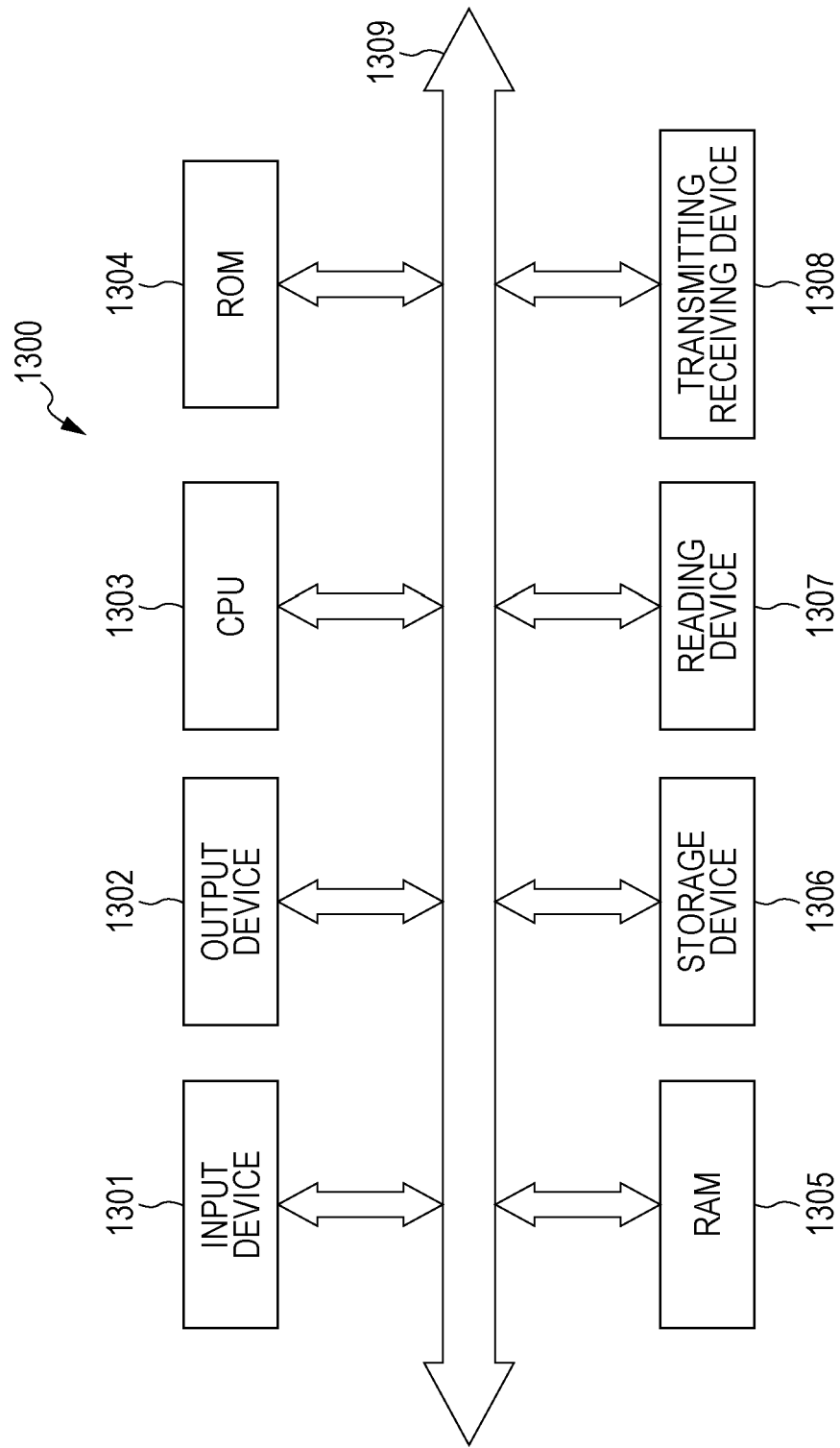
FIG. 7 is a view illustrating an example of a hardware configuration of a computer that realizes functions of the terminal device according to the embodiment of the present disclosure by software.

FIG. 7 is a view illustrating a hardware configuration of a computer that realizes the functions of the terminal 10 by a program. This computer 1300 includes an input device 1301 such as a keyboard, a mouse, or a touch pad, an output device 1302 such as a display or a speaker, a CPU (Central Processing Unit) 1303, a ROM (Read Only Memory) 1304, a RAM (Random Access Memory) 1305, a storage device 1306 such as a hard disc device or a SSD (Solid State Drive), a reading device 1307 that reads information from a recording medium such as a DVD-ROM (Digital Versatile Disk Read Only Memory) or a USB (Universal Serial Bus) memory, and a transmitting receiving device 1308 that performs communication via a network. Each of these sections are connected with each other by a bus 1309.

The reading device 1307 reads a program for realizing the functions of the terminal 10 from a recording medium in which the program is recorded, and then stores the program in the storage device 1306. Alternatively, the transmitting receiving device 1308 communicates with a server device that is connected to the network, and the terminal 10 downloads the program for realizing the functions of the terminal 10 from the server device to store the downloaded program in the storage device 1306.

Then, the CPU 1303 causes the program stored in the storage device 1306 to be copied in the RAM 1305, and then sequentially reads out a command included in the program from the RAM 1305 and execute the command. In this way, the functions of the terminal 10 are realized.

Modification 10

For example, in the above embodiment, the terminal 10 includes the moving image acquiring section 11, the metadata acquiring section 12, the control section 17, and the step recognizing section 14. However, the present disclosure is not limited to this. For example, these sections may be provided in a server device that can communicate with the terminal 10.

Modification 11

Figure 8:
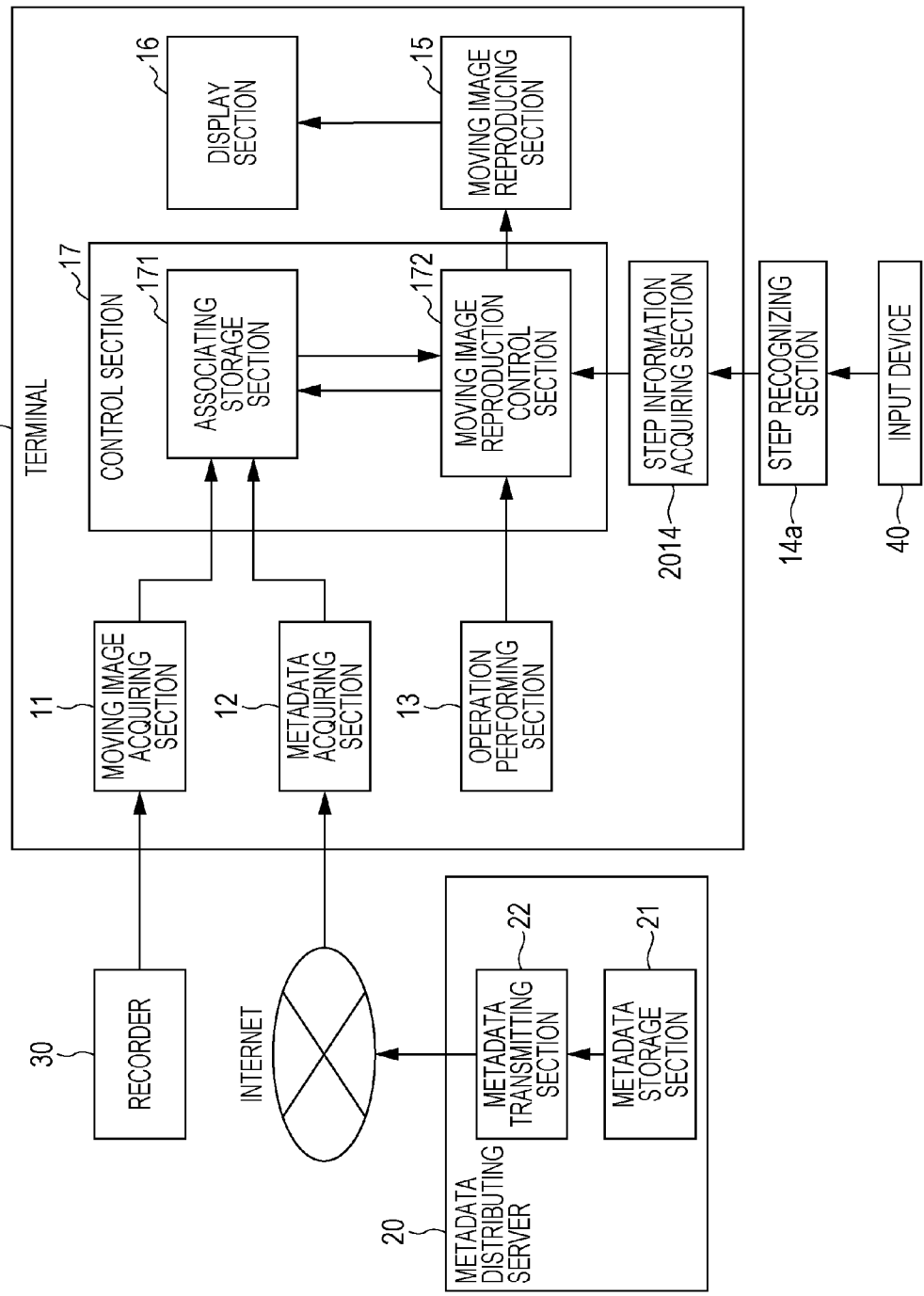
FIG. 8 is a block diagram illustrating an example of a configuration of a moving image control system according to the embodiment of the present disclosure.

For example, in the above embodiment, the terminal 10 includes the step recognizing section 14. However, the present disclosure is not limited to this. FIG. 8 is a block diagram illustrating an example of a configuration of a moving image control system of the present disclosure. In FIG. 8, constituent elements given identical reference numerals as those of FIG. 1 are identical to or equivalent to those illustrated in FIG. 1, and therefore are not explained repeatedly.

The configuration illustrated in FIG. 8 is different from that illustrated in FIG. 1 in that a step recognizing section 14a is provided in an external device that is separate from a terminal 10 and the terminal 10 includes a step information acquiring section 2014 that acquires a result of recognition by the step recognizing section 14a. The step recognizing section 14a is a control device, such as a processor, that receives step-in-execution information from an input device 40 and recognizes a preparation step that is being executed by a user (hereinafter referred to as a step in execution) on the basis of the information. Specifically, the step recognizing section 14a recognizes whether the step in execution is a heating step or a non-heating step and whether or not the step in execution has been completed.

Details of an operation (step recognizing processing) of the step recognizing section 14a is identical to that of the step recognizing section 14, and therefore are not explained in details here.

The external device is, for example, a head-mounted display (HMD) including a camera, a microphone, etc. The head-mounted display (HMD) includes, for example, the input device 40 and the step recognizing section 14a.

The terminal 10 and the HMD (or the step recognizing section 14a) are connected to each other via a wired network, a wireless network, or a network combining a wired network and a wireless network.

With such an arrangement, for example, the step recognizing processing is performed in the step recognizing section 14a provided in the head-mounted display (HMD) that corresponds to the device that is separate from the terminal 10. The HMD transmits (or outputs) recognition result information indicative of a result recognized by the step recognizing section 14a to the terminal 10. The step information acquiring section 2014 of the terminal 10 acquires (or receives) the recognition result information transmitted from the HMD.

The step information acquiring section 2014 supplies the recognition result information thus acquired to a moving image playback control section 172. The moving image playback control section 172 controls playback of a moving image on the basis of the recognition result information received from the step information acquiring section 2014.

According to the present modification, a user can use the recognition result information indicative of the result recognized by the step recognizing section 14a provided in the device that is separate from the terminal 10. This makes it unnecessary for the terminal 10 to include the step recognizing section 14 illustrated in FIG. 1. It is therefore possible to simplify the configuration of the terminal 10.

The present disclosure is suitably applicable to a terminal device, a control method, and a non-transitory recording medium in which a computer program is recorded each of which controls playback of a moving image on the basis of the contents of the moving image.

What is claimed is:

1. A terminal device comprising:
an acquiring section that acquires a moving image that sequentially introduces a plurality of preparation steps and metadata concerning chapters of the moving image that correspond to the plurality of preparation steps;
an associating storage section that associates the moving image with the metadata acquired by the acquiring section and that stores therein the moving image and the metadata; and
a moving image playback control section that reads out the moving image and the metadata from the associating storage section, that receives recognition result information indicating a result of recognition as to whether or not a preparation step executed by a user in keeping with progress of the moving image is a non-heating step and whether or not the preparation step executed by the user has been completed, and that controls playback of the moving image on the basis of the metadata and the recognition result information,
wherein at least one of the acquiring section, the associating storage section, the moving image playback control section, includes a processor,
wherein in a case where a chapter that introduces a predetermined non-heating step is being played back and execution of the non-heating step has not been completed, the moving image playback control section repeats or pauses the chapter that is being played back, and wherein in a case where a chapter that introduces a predetermined non-heating step is being played back and execution of the non-heating step is completed, the moving image playback control section plays back a subsequent chapter.

2. The terminal device according to claim 1, further comprising a step recognizing section that recognizes whether or not the preparation step executed by the user in keeping with the progress of the moving image is a non-heating step and that recognizes whether or not the preparation step executed by the user has been completed, the recognition result information is supplied to the moving image playback control section by the step recognizing section.

3. The terminal device according to claim 1, further comprising a recognition result acquiring section that acquires the recognition result information from an external device connected to the terminal device, wherein the recognition result acquiring section supplies the acquired recognition result information to the moving image playback control section.

4. The terminal device according to claim 1, wherein:
information concerning the preparation steps is registered as part of the metadata so as to be associated with the respective chapters; and
the moving image playback control section displays, in the form of a telop or a still image, information concerning a preparation step introduced in a subsequent chapter on the basis of the information concerning the preparation steps during repeat or pause of a predetermined chapter.

5. The terminal device according to claim 1, wherein, during repeat of a predetermined chapter, the moving image playback control section generates a display indicating that the predetermined chapter is being repeated.

6. The terminal device according to claim 1, wherein:
information indicative of a point in time at which a list display image showing a list of ingredients and amounts of the ingredients is displayed is registered as part of the metadata so as to be associated with any of the chapters; and
in a case where display of the list display image is requested, the moving image playback control section displays the list display image by jumping to the point in time on the basis of the information indicative of the point in time.

7. The terminal device according to claim 1, wherein:
information indicating that ingredients are heated to a predetermined state is registered as part of the metadata so as to be associated with a chapter that introduces a predetermined heating step; and
when the chapter that introduces the predetermined heating step is played back, the moving image playback control section repeats, pauses, or slow-plays the chapter that introduces the predetermined heating step on the basis of the information indicating that the ingredients are heated to the predetermined state until the moving image playback control section receives recognition result information indicating that the ingredients have reached the predetermined state.

8. The terminal device according to claim 1, wherein in a case where a predetermined signal sent from a device that is capable of communicating with the terminal device via a network is detected during playback of a chapter that introduces a predetermined heating step or in a case where recognition result information indicating that preparation has been interrupted is received during playback of the chapter that introduces the predetermined heating step, the moving image playback control section pauses playback of the chapter that introduces the predetermined heating step.

9. The terminal device according to claim 8, wherein the moving image playback control section controls that playback of the chapter, introducing the predetermined heating step, is repeated, paused, or slow-played during a period of time from a time at which the preparation is resumed to a time at which a temperature of ingredients returns to a temperature at a time of interruption of the preparation.

10. A method for controlling a terminal device,
the method causing a computer of the terminal device to:
acquire a moving image, which sequentially introduces a plurality of preparation steps, and metadata concerning chapters of the moving image that correspond to the plurality of preparation steps;
associate the moving image with the metadata;
store, in a predetermined storage section, the moving image and the metadata that are associated with each other;
read out the moving image and the metadata from the storage section,
receive recognition result information indicating a result of recognition as to whether or not a preparation step executed by a user in keeping with progress of the moving image is a non-heating step and whether or not the preparation step executed by the user has been completed; and
control playback of the moving image on the basis of the metadata and the recognition result information,
wherein at least one of the acquisition of the moving image, the association of the moving image, the storage of the moving image and the metadata, the reading out the moving image and the metadata, the reception of recognition result information, and the control of the playback is performed by a processor,
wherein in a case where a chapter that corresponds to a predetermined non-heating step is being played back and execution of the predetermined non-heating step has not been completed, the chapter that is being played back is repeated or paused, and
wherein in a case where a chapter that corresponds to a predetermined non-heating step is being played back and execution of the non-heating step is completed, a subsequent chapter is played back.

11. A non-transitory tangible recording medium on which a computer-readable computer program is recorded, the program causing the computer to:
acquire a moving image that sequentially introduces a plurality of preparation steps and metadata concerning chapters of the moving image that correspond to the plurality of preparation steps;
associate the moving image with the metadata;
store, in a predetermined storage section, the moving image and the metadata that are associated with each other;
read out the moving image and the metadata from the storage section;
receive recognition result information indicative of a result of recognition as to whether or not a preparation step executed by a user in keeping with progress of the moving image is a non-heating step and whether or not the preparation step executed by the user has been completed; and control playback of the moving image on the basis of the metadata and the recognition result information, wherein in a case where a chapter that corresponds to a predetermined non-heating step is being played back and execution of the predetermined non-heating step has not been completed, the chapter that is being played back is repeated or paused, and wherein in a case where a chapter that corresponds to a predetermined non-heating step is being played back and execution of the non-heating step is completed, a subsequent chapter is played back.

* * * * *